United States Patent
Kim et al.

(10) Patent No.: US 10,129,503 B1
(45) Date of Patent: Nov. 13, 2018

(54) IMAGE-CAPTURING WATCH

(71) Applicant: Apple Inc., Cupertino, CA (US)

(72) Inventors: Seung Wook Kim, Cupertino, CA (US); Megan A. McClain, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/271,072

(22) Filed: Sep. 20, 2016

(51) Int. Cl.
| | |
|---|---|
| *H04N 7/15* | (2006.01) |
| *H04N 7/14* | (2006.01) |
| *H04N 5/225* | (2006.01) |
| *H04N 5/247* | (2006.01) |
| *H04N 5/232* | (2006.01) |
| *G06F 3/01* | (2006.01) |
| *G04B 47/06* | (2006.01) |

(52) U.S. Cl.
CPC ............. *H04N 7/147* (2013.01); *G04B 47/06* (2013.01); *G06F 3/011* (2013.01); *H04N 5/2257* (2013.01); *H04N 5/23238* (2013.01); *H04N 5/23293* (2013.01); *H04N 5/247* (2013.01)

(58) Field of Classification Search
None
See application file for complete search history.

(56) References Cited

U.S. PATENT DOCUMENTS

| | | | | |
|---|---|---|---|---|
| 2002/0113862 A1* | 8/2002 | Center, Jr. | ............. | H04N 7/148 348/14.08 |
| 2004/0218474 A1 | 11/2004 | Yamazaki et al. | | |
| 2010/0215217 A1* | 8/2010 | Currivan | ................ | H04N 7/141 382/103 |
| 2011/0103643 A1* | 5/2011 | Salsman | ............ | G06K 9/00261 382/103 |
| 2012/0154511 A1* | 6/2012 | Hsu | ...................... | G06F 3/03545 348/14.03 |
| 2012/0262537 A1* | 10/2012 | Baker | .................... | H04N 7/152 348/14.08 |
| 2014/0160250 A1* | 6/2014 | Pomerantz | ......... | H04N 5/23229 348/47 |
| 2015/0059002 A1 | 2/2015 | Balram et al. | | |

(Continued)

FOREIGN PATENT DOCUMENTS

| | | |
|---|---|---|
| WO | WO 2014/081181 A1 | 5/2014 |
| WO | WO 2015/119835 A1 | 8/2015 |

*Primary Examiner* — Creighton Smith
(74) *Attorney, Agent, or Firm* — Morgan, Lewis & Bockius LLP

(57) ABSTRACT

An image-capturing device is disclosed. The image-capturing device may include two cameras, a watch body, and a watch band coupled to the watch body. The two cameras may simultaneously capture images. A processor of the image-capturing device may combine image data of the simultaneously-captured images from the two cameras into resultant image data representing a single continuous image. The images captured by the cameras may be moving images (i.e., video). The processor may identify a tracking target within the captured images and may continuously output target image data representing a target area of the image including the tracking target. Where the tracking target is a face captured from a low angle, the processor may angle-adjust the image so that the output target image data represents the face from a different angle (e.g., a front angle).

19 Claims, 3 Drawing Sheets

(56) References Cited

U.S. PATENT DOCUMENTS

| | | | |
|---|---|---|---|
| 2015/0085126 A1* | 3/2015 | Avnery | A01D 34/008 |
| | | | 348/148 |
| 2015/0258431 A1* | 9/2015 | Stafford | A63F 13/213 |
| | | | 463/31 |
| 2015/0332075 A1 | 11/2015 | Burch | |
| 2016/0176375 A1* | 6/2016 | Bolton | B60J 7/0573 |
| | | | 701/49 |
| 2016/0232811 A9* | 8/2016 | Connor | G09B 5/00 |
| 2016/0253791 A1* | 9/2016 | Kurata | G06K 9/00248 |
| | | | 348/241 |
| 2016/0282937 A1* | 9/2016 | Thorn | G06T 17/00 |
| 2017/0064214 A1* | 3/2017 | Zhang | H04N 5/265 |
| 2017/0197142 A1* | 7/2017 | Stafford | G06F 3/017 |
| 2017/0244959 A1* | 8/2017 | Ranjeet | H04N 13/0445 |

* cited by examiner

IMAGE-CAPTURING WATCH

FIELD

The described embodiments relate generally to an image-capturing device. More particularly, the present embodiments relate to a watch with cameras and a processor for capturing and processing images.

BACKGROUND

People use electronic devices to record video, which may be of themselves. For example, a person may record their face while talking, and may do so as part of a video conference in which the person's image is transmitted to another participant in the conference to be displayed on a device of the other participant during the video conference.

SUMMARY

The present disclosure describes image-capturing devices that can process captured images and output image data based on the captured images. For example, the output image data may represent only a portion of the source image originally captured. The source image may have been captured by one or more cameras of the image-capturing device, which may be a watch. The cameras may have wide-angle lenses. The wide angle lens and/or multiple cameras can help a user capture a larger scene containing a scene or a target subject of interest without requiring the user to precisely aim a camera of their watch or frame the shot at the time of capture, since the scene or target subject can be extracted from the source image data later. This can benefit the user since watches are usually worn on wrists, which may have a limited range of comfortable motion, or which are not always freely movable (for instance, while holding a beverage). Further, motion to aim a camera of a watch may move a viewfinder (if any) of the watch into an unobservable position, making precise aiming and framing difficult.

For example, some embodiments of image-capturing devices described herein include two cameras (each including a wide-angle lens), a watch body, and a watch band coupled to the watch body. The two cameras may simultaneously capture images. Then, a processor of the image-capturing device may combine image data of the simultaneously-captured images from the two cameras into resultant image data representing a single continuous image. The single continuous image may subsequently be cropped to include only a target scene or a subject of interest.

Image-capturing devices described herein may also identify and track a tracking target within the source image, and may automatically crop the image around the tracking target to output data of only the cropped image including the tracking target. This can benefit a user who may be using a watch as their image-capturing device while recording their face (e.g., to store as a recording or for real-time transmission to another person participating in a video conference with the user). Especially where a camera of the watch includes a wide-angle lens, the source image captured may be quite large, and the face of the user (the tracking target) may move around within the source image as the user moves their wrist. By tracking and only outputting image data representing an area around and including the user's face, the video output appears to consistently center on and be framed around the user's face. This presents a more consistent image of the user (e.g., to the other person on the video conference) without requiring the user to maintain a steady wrist position.

For example, some embodiments of image-capturing devices described herein include a camera and a processor, where the camera captures a moving image that includes a tracking target, which may be the user's face. The processor then identifies the tracking target and continuously outputs target image data representing a target area of the image. The target area includes the tracking target and has a boundary around the tracking target. It excludes the portion of the source image outside the boundary.

In some circumstances, a user may prefer the appearance of their face from a certain angle (e.g., straight from the front), but the user may find it more comfortable to hold their wrist (and watch) at a different angle (e.g., at a low angle, below the user's face). Image-capturing devices described herein can process the source image data taken from the low angle, and can angle-adjust the image so that it appears to have been taken straight from the front. This feature allows a user to maintain a comfortable position of their wrist, while still outputting image data that appears to have been taken from a desired angle.

For example, some embodiments of image-capturing devices described herein use a camera to capture the moving image including the tracking target (i.e., the user's face) from a first angle relative to the tracking target. A processor may continuously output target image data that represents the tracking target from a second angle relative to the tracking target, different from the first angle.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
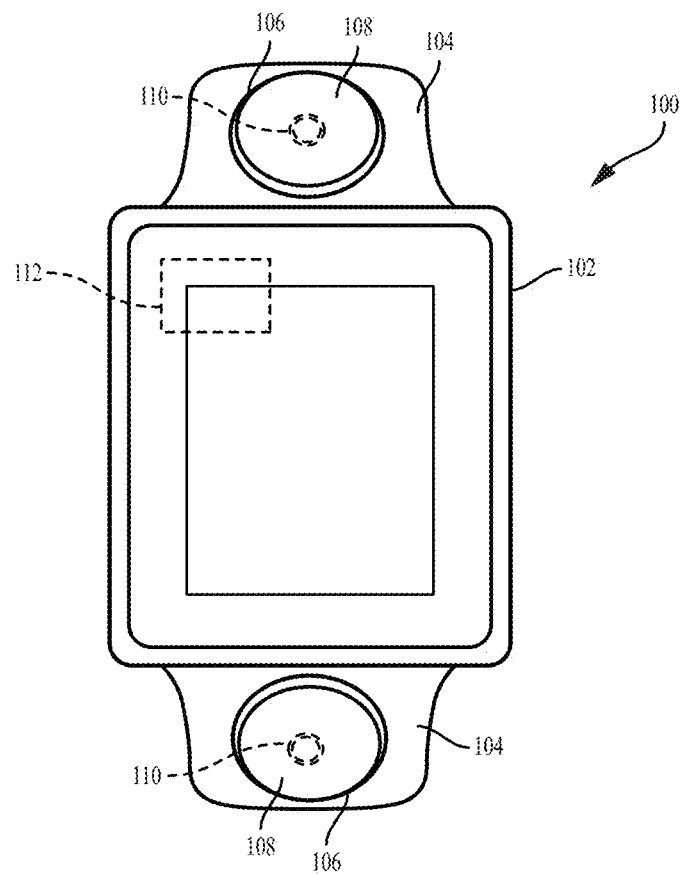
FIG. 1 shows a top view of an image-capturing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

A smartwatch that has the capability to capture images and video may provide an opportunity for users to be more reliant on their smartwatch and less reliant on other devices (e.g., smartphones, tablets, digital cameras) to capture images or videos. Thus, such a smartwatch may enable a user to forego carrying a smartphone when doing some activities, especially activities or environments where it might be difficult to take a smartphone (e.g., hiking, running, swimming, surfing, snowboarding, and any number of other situations). Additionally, a smartwatch with the capability of capturing images may enable a user to capture images that would not be conveniently captured with a smartphone. However, by angling a smartwatch or band to aim its optical sensor, a user may become uncomfortable, especially when trying to steadily record video, and may be unable to see an image or video displayed on the smartwatch's display screen in the moment of capture, since the smartwatch's display would move along with the optical sensor.

Thus, to address these difficulties and to improve the user's experience, some of the embodiments described herein provide a smartwatch that has a camera with a wide-angle lens for its optical sensor. The camera may be positioned on the smartwatch's band. The user may capture images or video with the camera over a wide field of view due to the wide-angle lens. The image target may thus be included in the wide field of view without the user having to aim an optical sensor directly at the image target. The large image captured with the wide field of view may then be reduced (i.e., "cropped") to only include the image target, or any other portion of interest to the user. This can reduce the extent to which a user may have to move their arm to capture a desired image, and can reduce the precision with which a user must aim their camera in order to capture a desired image.

The ability to capture a wide field of view in a single image can be useful in many contexts. For example, a user need only orient their camera in the general direction of a target, and can be confident of capturing the target in a captured image. This can be especially convenient when attempting to capture a temporary or unexpected event. For example, a user watching a sporting event may be able to capture a fleeting moment of excitement when their team scores a goal by simply raising their wrist toward the action and actuating their camera in the moment. They can later review the image captured in the wide field of view to identify and save the portions of the larger image that are of interest.

A user may also wish to use a camera on their smartwatch to participate in a video teleconference, or to otherwise capture or record their visage. But holding their wrist steady to orient a camera lens directly at their face can be tiring and awkward, especially for long durations. The wide-angle lens of embodiments of the present invention can alleviate this difficulty, by allowing the camera lens to be only generally oriented in the direction of the user's face, thereby allowing much greater motion of the camera lens (and user's wrist) while still keeping the user's face in the field of view.

To keep the resultant image directed to the user's face, however, a smartwatch as described herein may process the captured image, recognize the user's face, and automatically output a cropped image that is centered on the user's face, even while the user moves the location and orientation of the camera capturing the image. This can maintain a consistent output image of the user's face, while also facilitating more natural and comfortable positioning of the user's arm and wrist.

Further, captured image or video of a user's face taken from the vantage of a user's wrist may have a tendency to be taken from a low angle, since comfortable wrist positions tend to be below face-level. Users may find this "up-nose" angle to be unflattering. To alleviate this difficulty, a smartwatch as described herein may process the captured image to output an image of the user's face that appears taken from a different angle that may be considered more flattering. For example, the user's smartwatch may output an image that appears to be taken from directly in front of the user's face, rather than from below it, even though the source image captured by the camera is captured from below. This can help a user present themself from a more flattering angle without having to hold their wrist and camera at the desired angle.

These and other embodiments are discussed below with reference to the figures. However, those skilled in the art will readily appreciate that the detailed description given herein with respect to these figures is for explanatory purposes only and should not be construed as limiting.

Figure 2:
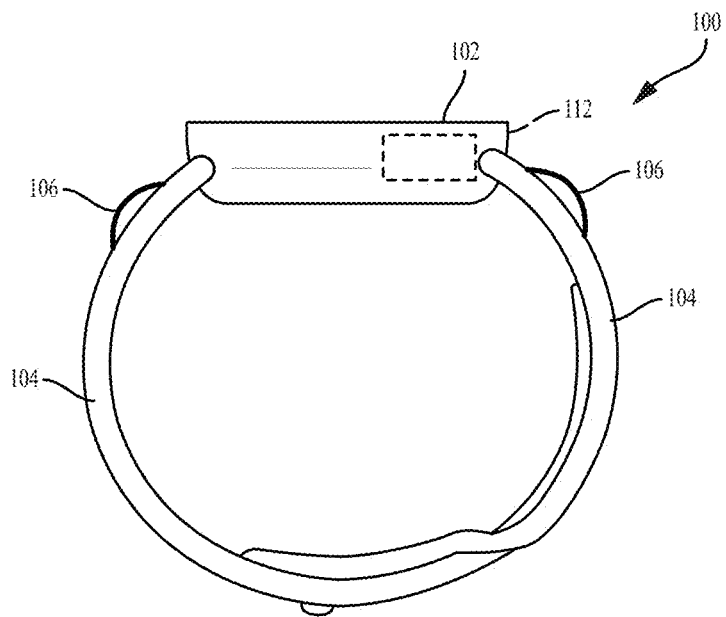
FIG. 2 shows a side view of the image-capturing device of FIG. 1.

FIG. 1 illustrates a front view of an image-capturing device 100. FIG. 2 illustrates a side view. Image-capturing device 100 may be any device including image-capturing capability, for example, a smartwatch (as shown), a smartphone, a computer (e.g., a tablet, laptop, or desktop computer), or a standalone camera. For clarity and convenience however, image-capturing device 100 will often be referred to as watch 100 in the present description. As shown, watch 100 is a smartwatch, and includes a watch body 102 and a watch band 104. Watch band 104 includes two cameras 106, each of which includes a lens 108 and an optical sensor 110. Watch 100 may also include a processor 112.

A user may wear watch 100 on their wrist, and may use cameras 106 of watch 100 to capture images of themselves or their surroundings. While traditional camera-including devices include only one camera, watch 100 includes two cameras 106, each oriented in a different direction. As used herein, "camera" refers to any electronic component or combination capable of capturing images, including, for example, a lens and an optical sensor arranged to receive light through the lens.

A user may actuate cameras 106 simultaneously to capture a still image or to begin recording a moving image (i.e., a video or other sequence of still images). Processor 112 may receive the separate images and image data captured simultaneously by each of cameras 106, and may combine the separate image data to represent a single combined image, thereby allowing a user to capture an image with a larger field-of-view than would be possible with a single camera. Processor 112 may combine the separate image data in such a way that overlapping areas of the captured images are merged together to represent two simultaneously captured images as a single continuous image. A user may later review the single continuous image and crop it as desired to retain only portions of interest, which may be saved as individual image data.

Camera lens 108 may be any type of camera lens, for example, a normal lens, wide-angle lens, long-focus lens, macro lens, zoom lens, apochromatic lens, fisheye lens, stereoscopic lens, or soft-focus lens. To obtain larger fields-of-view however, camera lens 108 may have a wide angle of view, for example, greater than 60 degrees (e.g., 100-180 degrees), such as is common in wide-angle and fisheye lenses. As used herein, a wide angle of view refers to an angle of view greater than 60 degrees (e.g., greater than 100 degrees), and a camera with a "wide angle lens" refers to a camera with an angle of view greater than 60 degrees (e.g., greater than 100 degrees).

Figure 3:
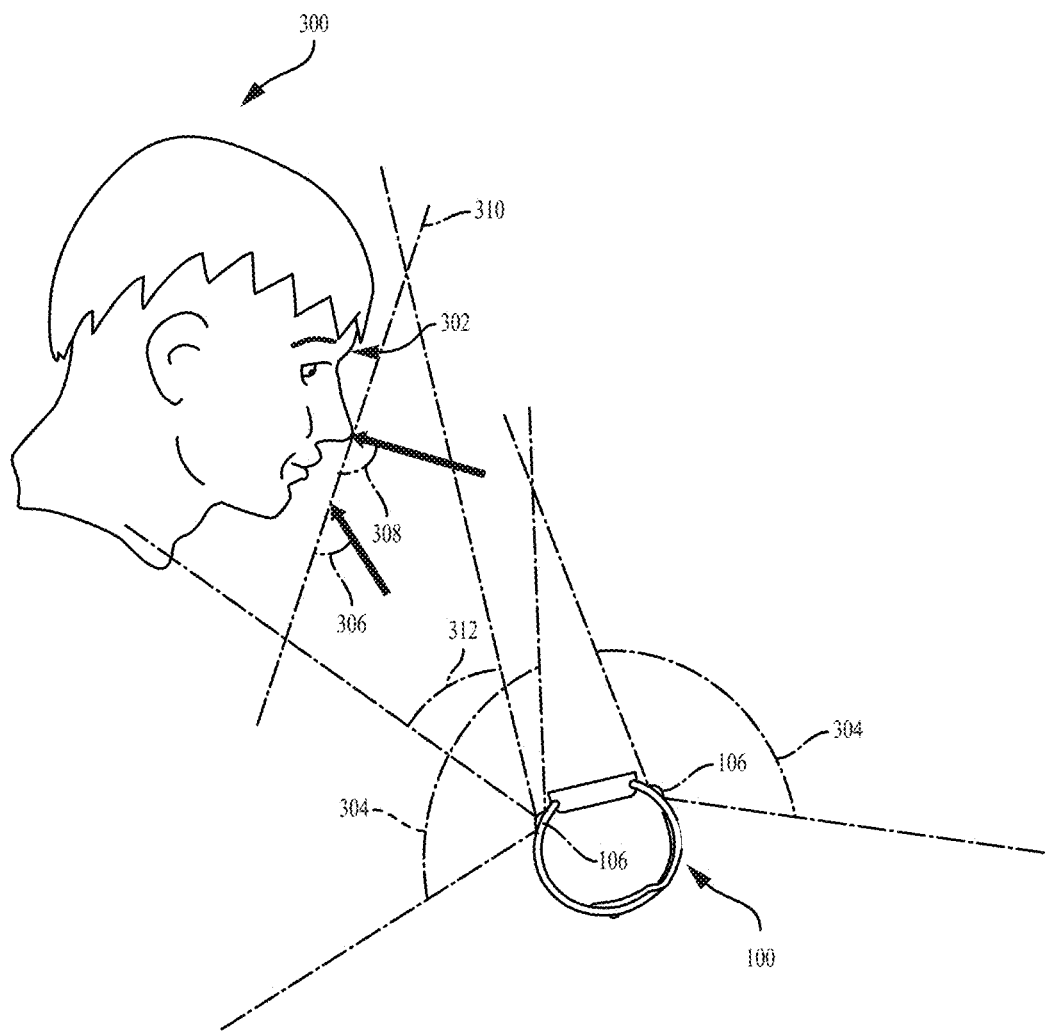
FIG. 3 shows a user with the image-capturing device of FIG. 1.

FIG. 3 shows a user 300 wearing watch 100. For clarity, only the user 300's head is shown, including user 300's face 302. Each camera 106 has an angle of view 304, which may be a wide angle of view. User 300 may desire, for example, to record themself or to participate in a video conference using cameras 106 to capture their visage and watch 100 to process image data generated by cameras 106 and to output resultant image data for storing or for forwarding to another participant in the video conference. Watch 100 may allow user 300 the freedom to move watch 100—thereby changing the angles between cameras 106 and the user's face 302— while maintaining image data output that is centered on user 300's face, for recording or forwarding to the other participant. In other words, within the image data generated by cameras 106, user 300's face 302 is a tracking target that is automatically and continuously tracked and output by watch 100.

Watch 100 may be calibrated to recognize and identify a face as its tracking target (e.g., watch 100 may identify the closest (largest) face within its image data as the tracking target). In some embodiments, a user may pre-register their face with watch 100 as the tracking target (e.g., by identifying their face within image data stored on watch 100 through a tracking target registration interface of watch 100). Alternatively or additionally, user 300 may register other things or people as tracking targets through such a tracking target registration interface. For example, to register a new tracking target a user may tap their finger on the desired tracking target as it is displayed on a touch display of watch 100.

Figure 4:
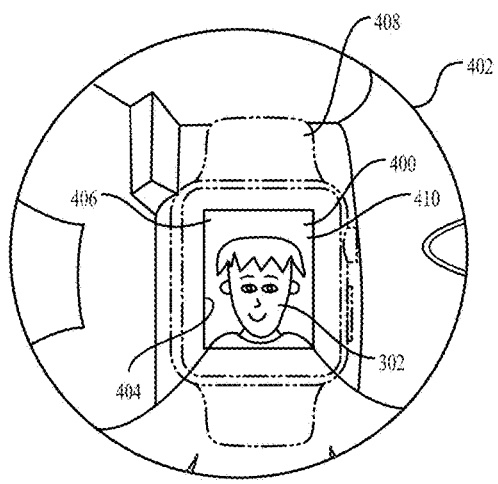
FIGS. 4 and 5 show example image data output.

FIG. 4 shows an example output of target image data 400 representing user 300's face displayed on a display screen 406 of a remote device 408. To help visualize the processing of source images to obtain target image data 400, a representation of source image data 402 from which target image data 400 is taken is shown around the representation of target image data 400. In source image data 402 as represented in FIG. 4, processor 112 has identified a target area 410 including user 300's face 302 and has cropped source image data 402 to remove the portion of source image data 402 outside target area 410, thereby creating target image data 400. Target image data 400 is then output by processor 112, for example to be transmitted to remote device 408 for display on display screen 406.

In some embodiments, target area 410 includes user 300's face 302 and some specified area around face 302, for example to include the user's whole head and to fit a boundary 404 of output display screen 406, possibly with some additional distance between the user's head and boundary 404. An example target area angle 312 is shown in FIG. 3. Boundary 404 may remain close to user 300's head, however, so that the head takes up most of target area 410 (e.g., greater than 60% or greater than 75% of target area 410). For example, boundary 404 may be spaced away from user's head by at most 50% of the maximum linear dimension of target area 410 (e.g., 30% or less).

Figure 5:
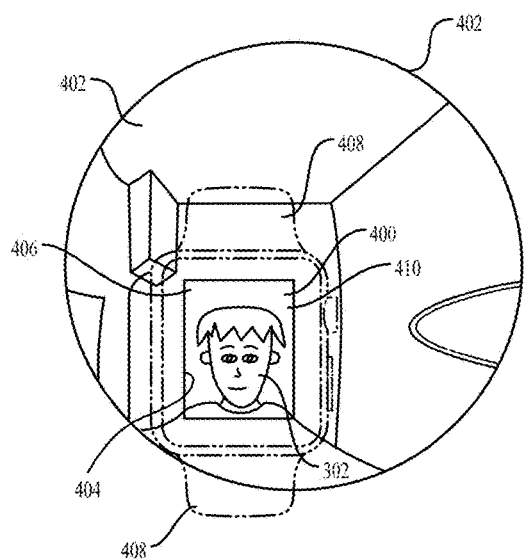

As shown in FIG. 4, to maintain a consistent output of target image data 400 representing user 300's face throughout motion of watch 100 relative to face 302, watch 100 may capture source image data 402 representing user 300's face and a substantial amount of area around target image data 400. For example, user 300's face 302 may account for less than 40% of the area of an image captured by watch 100 (e.g., less than 20% or less than 10%). By capturing such a large area, there is a substantial margin for motion of watch 100 in which face 302 will still be in the field of view of cameras 106. As the relative position of face 302 within source image data 402 changes—for example from the position shown in FIG. 4 to the position shown in FIG. 5—processor 112 may identify the new position of face 302, and process a target area 410 around face 302 to continuously generate target image data 400 in the same manner as described above.

Processor 112 may continuously identify the current position of face 302 within image data 402 and output target image data corresponding to target area 410 around face 302 in real time. By such tracking and outputting continuous image data of user 300's face, user 300 can be confident that they are transmitting an optimal representation of their face to other teleconference participants. As used herein, "real time" may include delays inherent to processing and transmission technology, delays designed to optimize resources, and other inherent or desirable delays that would be apparent to one of skill in the art.

In some embodiments, watch 100 may include only one camera 106, or may use only one camera 106 at a time in any of the manners described herein. In embodiments where watch 100 includes two or more cameras 106, angles of view 304 of cameras 106 may overlap (see FIG. 3) to have the capability to capture a continuous image between them, thereby generating source image data for the continuous image. In some embodiments angles of view 304 may overlap less than 2 feet (e.g., less than 1 foot) from watch 100. Such a close overlap point can allow a user's face to travel between angles of view 304 of cameras 106 without interruption, since a user's wrist will typically be held greater than 1-2 feet away from their face when capturing video with watch 100.

In some circumstances, as shown in FIG. 3, watch 100 is positioned below user 300's face 302, since this position may be most comfortable for the arm and wrist of user 300 wearing watch 100. Thus, cameras 106 of watch 100 capture images of user 300's face 302 from a low angle 306 (e.g., from a position below user 300's chin). But a user may prefer to present images of their face from a different angle, such as front angle 308 (e.g., from a position in front of face 302). For reference, angles 306 and 308 are shown relative to a reference plane 310 that is normal to the direction in which face 302 is pointed.

Figure 6:
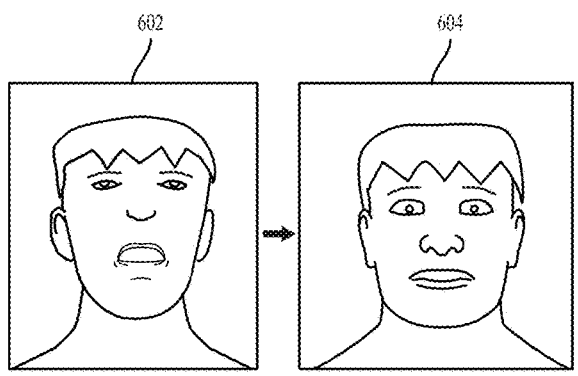
FIG. 6 shows an example change in apparent angle of image data output.

Rather than requiring user 300 to hold their wrist or otherwise position watch 100 in front of their face 302 in order to capture video images of their face 302 from front angle 308, watch 100 may allow user 300 to capture video and images of their face 302 from low angle 306, and may output target image data representing face 302 from front angle 308. As shown in FIG. 6, an image 602 of face 302 is captured as source data by cameras 106 from low angle 306. The source data is processed by processor 112 to create a representation of face 302 taken from front angle 308, as shown in image 604. Target image data representing image 604 is outputted by processor 112, so that the image recorded or forwarded to video conference participants appears to have been taken from front angle 308. In other words, as user 300 moves their face 302 (e.g., in talking and making facial expressions), such motion is identified by processor 112, and processor 112 constructs a representation of user 302's face from front angle 308 making the same movements. So target image data output by processor 112 includes a representation of user 300's face 302 from front angle 308 making motions in real time that correspond to those made by user 300's face 302 as they are captured from low angle 306.

Processor 112 may generate image data representing angle-adjusted image 604 based on stored facial data of user 300. For example, user 300 may have previously undergone a process to register their face with watch 100 to create such stored facial data. Watch 100 may have recorded and processed (e.g., with processor 112) images or video of user 300's face 302 from the desired output angle (e.g., front angle 308) and from other angles throughout various motions of face 302. Processor 112 may use such previously recorded data in order to be able to output an accurate real-time representation of user 300's face at the desired output angle 308 when an input angle (e.g., low angle 306) is captured by camera 106 that is different from the desired output angle. In some embodiments, user 300's image may only be angle-adjusted as described above if input angle 306 is different from predetermined desired output angle 308 by a predetermined degree, for example greater than 10 degrees (e.g., greater than 30 degrees).

In some embodiments, rather than an angle-adjusted version of user 300's face 302, user 300 may have chosen a different avatar to be represented in target image data output by processor 112. Image data for such avatar may be stored and processed in the same manner as the stored facial data of user 300 described above. Image data for such avatar may have been generated through a facial registration process of a different person's face, or may have been independently downloaded or created to represent a non-person avatar, such as an animal, cartoon, or other anthropomorphic object.

In any of the embodiments described herein, when preparing target image data for output, processor 112 may remove (or not include) any image data that does not represent user 300 (e.g., image data that does not represent user 300's face 302). For example, the background around user 300's face 302 may be removed. This may help user 300 maintain privacy by not inadvertently capturing things around user 300. It may also promote use of video recording or video conferencing when user 300 is in an environment or around articles that user 300 does not wish to divulge, since such background imagery will not be outputted by watch 100.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A wristwatch, comprising:
   a watch body;
   a watch band coupled to the watch body;
   two cameras disposed on the watch band, each camera comprising a wide-angle lens, wherein the two cameras have overlapping angles of view and are configured to simultaneously capture images; and
   a processor configured to combine image data of simultaneously-captured images from the two cameras into resultant image data including a representation of the user's face that is an angle-adjusted version of the user's face produced based on facial calibration data previously generated from the user.

2. The wristwatch of claim 1,
   wherein the processor combines image data of simultaneously-captured images from the two cameras into resultant image data representing a single continuous image.

3. The wristwatch of claim 1,
   wherein the two cameras capture moving images including a tracking target,
   wherein the processor identifies the tracking target within simultaneous image data of simultaneously-captured images from the two cameras and continuously outputs target image data representing a target area of the simultaneous images,
   wherein the target area excludes a portion of the simultaneous image data not including the tracking target,
   wherein the processor continuously updates the target area as the tracking target moves within the moving image, and
   wherein the wristwatch transmits the target image data to a display device remote from the wristwatch, for display in real-time relative to the movement of the moving image.

4. The wristwatch of claim 3, wherein the tracking target is the face of a user wearing the watch band and watch body,
   wherein at least one of the cameras captures the moving image including the tracking target from a first angle relative to the tracking target,
   wherein the target image data continuously outputted by the processor represents the tracking target from a second angle relative to the tracking target,
   wherein the second angle is different from the first angle,
   wherein the processor identifies motion of the user's face in the moving image captured from the first angle,
   wherein the processor constructs a representation of the user's face from the second angle, wherein motion of the representation corresponds to motion of the user's face,
   wherein the target image data continuously outputted by the processor includes the representation.

5. A wristwatch, comprising:
   a camera; and
   a processor,
   wherein the camera captures a moving image including a tracking target,
   wherein the processor identifies the tracking target and continuously outputs target image data representing a target area of the moving image,
   wherein the target area includes the tracking target and has a boundary around the tracking target,
   wherein the target area excludes a portion of the image outside the boundary,
   wherein the tracking target is a face of a user of the wristwatch, wherein the camera captures the moving image including the tracking target from a first angle relative to the tracking target and from a second angle relative to the tracking target, wherein the second angle is different from the first angle.

6. The wristwatch of claim 5, wherein the processor continuously tracks the tracking target and continuously updates the target area as the tracking target moves within the moving image.

7. The wristwatch of claim 5, wherein the boundary corresponds to the size and shape of a display screen on which the image data is to be displayed.

8. The wristwatch of claim 5, wherein the boundary is spaced away from the tracking target by at most 50% of the maximum linear dimension of the target area.

9. The wristwatch of claim 5, wherein the wristwatch comprises a watch band, and
wherein the watch band comprises the camera.

10. The wristwatch of claim 5, wherein the camera includes a wide-angle lens, and captures the moving image through the wide-angle lens.

11. The wristwatch of claim 5, wherein the wristwatch transmits the target image data to a display device remote from the wristwatch, for display in real-time relative to the movement of the moving image.

12. The wristwatch of claim 5, wherein the continuously output target image data includes only the tracking target.

13. The wristwatch of claim 5, wherein the processor identifies motion of the user's face in the moving image captured from the first angle,
wherein the processor constructs a representation of the user's face from the second angle, wherein motion of the representation corresponds to motion of the user's face, and
wherein the target image data continuously outputted by the processor includes the representation.

14. The wristwatch of claim 13, wherein the representation of the user's face is an angle-adjusted version of the user's face.

15. The wristwatch of claim 14, wherein the angle-adjusted version of the user's face is produced based on facial data previously generated from the user.

16. The wristwatch of claim 13, wherein the representation of the user's face is an avatar chosen by the user.

17. A method for processing image data, the method comprising:
capturing a moving image with a camera;
identifying a tracking target within the moving image;
automatically tracking the tracking target as the tracking target moves within the moving image; and
outputting target image data representing a target area of the moving image,
wherein the target area includes the tracking target and excludes portions of the moving image not including the tracking target,
wherein the tracking target is a face of a user, and
wherein the outputted target image data represents a face of the user from a first angle and a second angle, wherein the second angle is different from the first angle.

18. The method of claim 17, wherein the moving image is captured by two cameras, and
wherein the two cameras are mounted on the wrist of a user.

19. The wristwatch of claim 1, wherein the cameras capture moving images including the face of a user wearing the wristwatch,
wherein the wristwatch is configured to output a real-time image of the user's face while the user's face is within the angle of view of either camera, and
wherein the outputted image remains centered on the user's face.

* * * * *